United States Patent
Mahamuni et al.

(10) Patent No.: US 9,294,584 B2
(45) Date of Patent: Mar. 22, 2016

(54) TRANSPORTING SERIALLY OVER TCP/IP USING RAW TCP ENCAPSULATION

(71) Applicant: Cisco Technology, Inc., San Jose, CA (US)

(72) Inventors: Atul B. Mahamuni, Fremont, CA (US); Carol Barrett, Palo Alto, CA (US)

(73) Assignee: Cisco Technology, Inc., San Jose, CA (US)

( * ) Notice: Subject to any disclaimer, the term of this patent is extended or adjusted under 35 U.S.C. 154(b) by 247 days.

(21) Appl. No.: 13/921,619

(22) Filed: Jun. 19, 2013

(65) Prior Publication Data

US 2014/0376547 A1    Dec. 25, 2014

(51) Int. Cl.
H04L 29/08    (2006.01)
H04L 29/06    (2006.01)
H04L 12/801    (2013.01)

(52) U.S. Cl.
CPC .............. *H04L 67/32* (2013.01); *H04L 47/35* (2013.01); *H04L 69/08* (2013.01); *H04L 69/163* (2013.01); *H04L 69/22* (2013.01); *H04L 69/324* (2013.01)

(58) Field of Classification Search
None
See application file for complete search history.

(56) References Cited

U.S. PATENT DOCUMENTS

| | | | |
|---|---|---|---|
| 6,205,407 B1 * | 3/2001 | Testa et al. | 702/119 |
| 6,243,667 B1 | 6/2001 | Kerr et al. | |
| 6,308,148 B1 | 10/2001 | Bruins et al. | |
| 6,578,084 B1 | 6/2003 | Moberg et al. | |
| 6,590,894 B1 | 7/2003 | Kerr et al. | |
| 6,601,106 B1 | 7/2003 | Moberg et al. | |
| 6,907,468 B1 | 6/2005 | Moberg et al. | |
| 7,006,532 B1 | 2/2006 | Kathail et al. | |
| 7,260,518 B2 | 8/2007 | Kerr et al. | |
| 7,302,499 B2 | 11/2007 | Johnson | |
| 7,475,156 B2 | 1/2009 | Kerr et al. | |
| 7,970,948 B1 | 6/2011 | Moberg et al. | |
| 8,139,486 B1 | 3/2012 | Yu et al. | |
| 2006/0242271 A1 * | 10/2006 | Tucker et al. | 709/220 |
| 2008/0010389 A1 * | 1/2008 | Iwata | 710/29 |
| 2008/0049746 A1 * | 2/2008 | Morrill et al. | 370/389 |
| 2012/0026900 A1 | 2/2012 | Chandrasekaran et al. | |

OTHER PUBLICATIONS

"Magnum Network Software—DX", Administrator's Guide, 2007, 290 pages, GarrettCom Utility Networks, North Andover, MA.
"Rugged Operating System (ROS)", v3.12.1 User Guide, RMC30, Feb. 2013, 172 pages, RuggedCom Inc.

(Continued)

*Primary Examiner* — Alex Skripnikov
*Assistant Examiner* — Rodrick Mak
(74) *Attorney, Agent, or Firm* — Parker Ibrahim & Berg LLC; James M. Behmke; Stephen D. LeBarron

(57) ABSTRACT

In one embodiment, a router establishes a serial-over-TCP/IP (Transmission Control Protocol/Internet Protocol) communication session between terminal units using raw-TCP encapsulation. For the session, the router maps serial characters to TCP out-of-band (OOB) communication fields, maps serial flow control signals to TCP/IP receiver-window advertisements, and dynamically adjusts a TCP/IP priority based on serial payload priority. Accordingly, the router may thus communicate data over the serial-over-TCP/IP session based on the mappings and priority.

20 Claims, 4 Drawing Sheets

(56) References Cited

OTHER PUBLICATIONS

"Transmission Control Protocol, Darpa Internet Program, Protocol Specification", Request for Comments 793, Sep. 1981, 90 pages, Information Sciences Institute, University of Southern California, Marina del Rey, CA.

Gont, F. et al.: "On the Implementation of the TCP Urgent Mechanism", RFC6093.txt, Internet Engineering Task Force, IEFT, Standard, Internet Society (ISOC) 4, Rue des Falaises CH-1205 Geneva, Switzerland, Jan. 4, 2011, pp. 1-12.

International Search Report issued Feb. 5, 2015 in connection with PCT/US2014/043284.

* cited by examiner

TRANSPORTING SERIALLY OVER TCP/IP USING RAW TCP ENCAPSULATION

TECHNICAL FIELD

The present disclosure relates generally to computer networks, and, more particularly, to serial data links separated by an Internet Protocol (IP) network.

BACKGROUND

Many serial data links between two end points, such as modem connections, have recently been transported over (e.g., separated by) a heterogeneous Internet Protocol (IP) network for a variety of well understood reasons. For example, utility devices (e.g., meters, sensors, etc.) that have traditionally been interconnected over serial protocols (e.g., IEC-60870-5-101, a.k.a. "IEC-101" or "T-101") have been transported over an IP network using an IP-ready protocol (e.g., IEC-60870-5-104, a.k.a. "IEC-104" or "T-104"). Generally, this is accomplished by interconnecting the end points with respective routers, which may translate the serial transmissions to IP transmissions, and vice versa, thus emulating to the end points as if they were communicating directly with each other. One problem associated with such communication, however, is that current implementations simply take the serial data and put it on TCP sockets.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a router establishes a serial-over-TCP/IP (Transmission Control Protocol/Internet Protocol) communication session between terminal units using raw-TCP encapsulation. For the session, the router maps serial characters to TCP out-of-band (OOB) communication fields, maps serial flow control signals to TCP/IP receiver-window advertisements, and dynamically adjusts a TCP/IP priority based on serial payload priority. Accordingly, the router may thus communicate data over the serial-over-TCP/IP session based on the mappings and priority.

Description

A computer network is a geographically distributed collection of nodes interconnected by communication links and segments for transporting data between end nodes, such as personal computers and workstations. Many types of networks are available, with the types ranging from local area networks (LANs) to wide area networks (WANs). LANs typically connect the nodes over private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" (e.g., capacity and performance) of each network.

Figure 1:
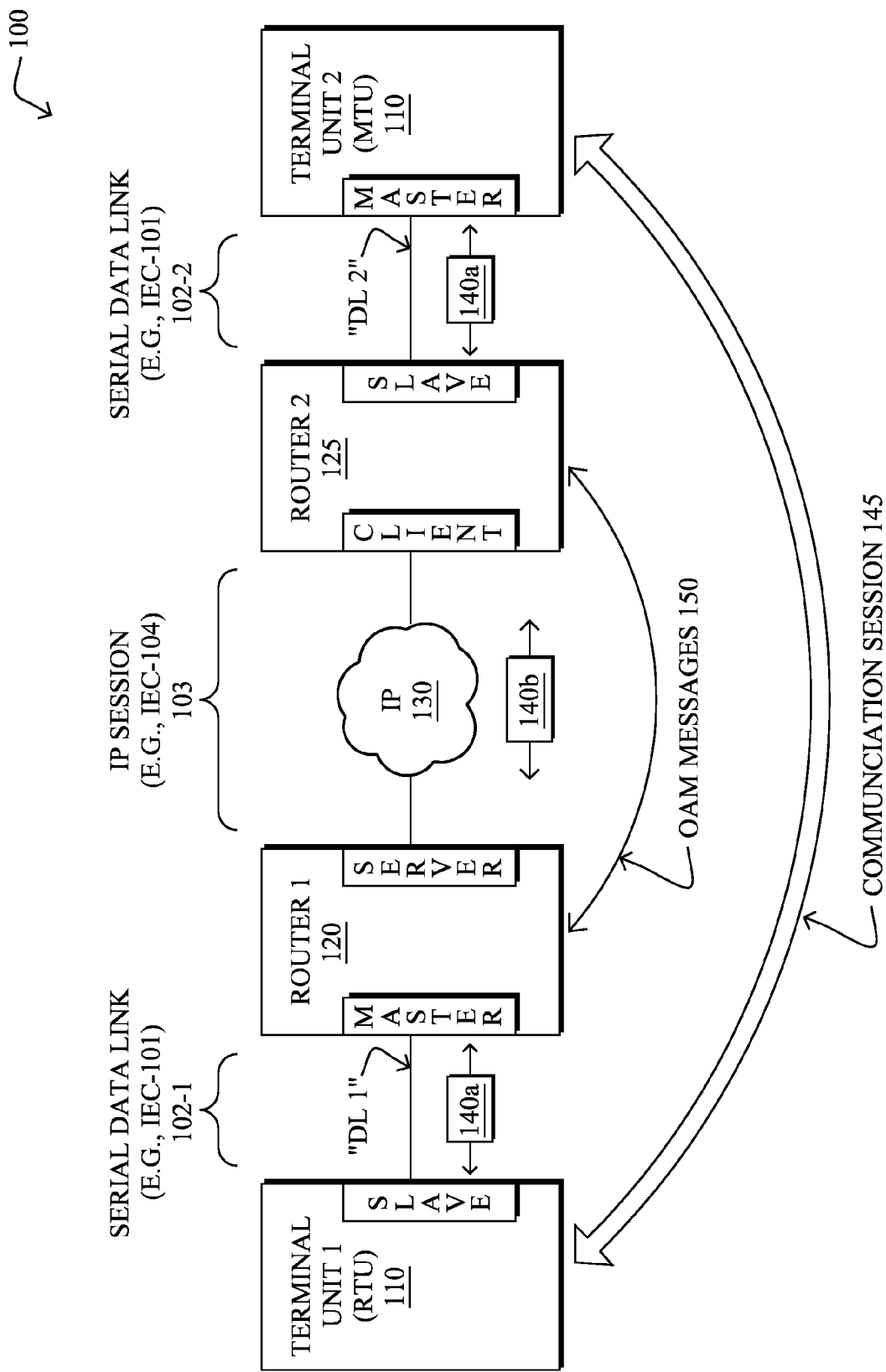
FIG. 1 illustrates an example communication network.

FIG. 1 is a schematic block diagram of an example computer network 100 illustratively comprising nodes/devices, such as first and second terminal units 110 and 115, respectively, interconnected via first and second routers 120 and 125, respectively, as shown. For example, illustrative terminal units may comprise a "remote terminal unit" (RTU, shown as 110) generally configured to communicate over serial data links. Illustratively, RTU 110 may comprise a utility device meant to interconnect to various actuators, meters, sensors, etc. Network 100 may also comprise a local or master terminal unit (MTU, shown as 115), such as a device generally located at a supervisory control and data acquisition (SCADA) center. As described in more detail herein, each terminal unit may be interconnected to a translating router via a serial data link and corresponding serial data link (collectively, 102). The translating routers may in turn be interconnected to each other over the Internet 130 through an IP session 103. The two end points as shown may thus communicate over a communication session 145, as described in more detail below. Those skilled in the art will understand that any number of nodes, devices, links, etc. may be used in the computer network, and that the view shown herein is for simplicity.

Data 140 (e.g., packets, traffic, messages, signals, etc.) may be exchanged among the nodes/devices of the computer network 100 using predefined network communication protocols depending upon the type of interface/network between the communicating devices. For example, data 140a may be signals transmitted serially using various serial communication protocols (e.g., modems), while data/packets 140b may be exchanged using various IP protocols or other suitable protocols as may be appreciated by those skilled in the art (e.g., TCP/IP, User Datagram Protocol (UDP), Asynchronous Transfer Mode (ATM) protocol, Frame Relay protocol, Internet Packet Exchange (IPX) protocol, etc.). Illustratively, session protocols, operating on top of the underlying physical transmission protocols, may be selected according to the underlying physical protocol and desired functionality. For example, as described herein, an example serial data link protocol used for utility devices (meters, sensors, etc.) is IEC-101, while an example IP session protocol to interconnect the serial data links is IEC-104. Other types of session protocols may be used, and those mentioned herein are merely illustrative.

Figure 2:
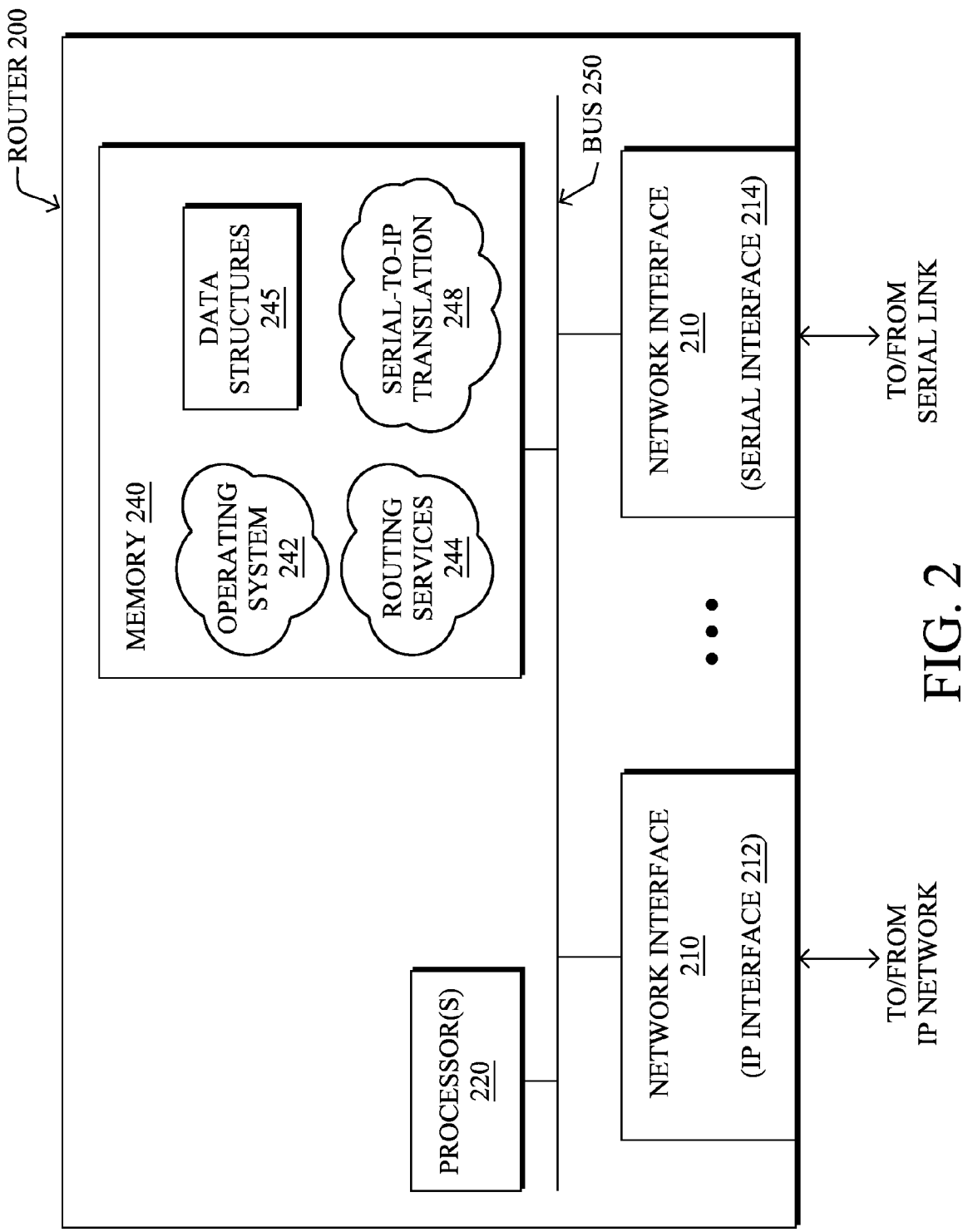
FIG. 2 illustrates an example network device/node.

FIG. 2 is a schematic block diagram of an example node/ device 200 that may be used with one or more embodiments described herein, e.g., as routers 120 and 125. The device comprises a plurality of network interfaces 210, one or more processors 220, and a memory 240 interconnected by a system bus 250. The network interfaces 210 contain the mechanical, electrical, and signaling circuitry for communicating data over physical or wireless links coupled to the network. The network interfaces 210 may be configured to specifically transmit and/or receive data using a variety of different communication protocols, such as IP protocols over an IP network interface 212 and serial data link protocols over a serial data link network interface 214.

The memory 240 comprises a plurality of storage locations that are addressable by the processor(s) 220 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc.), portions of which are typically resident in memory 240 and executed by the processor(s), functionally organizes the node by, inter alia, invoking network operations in support of software processes and/or services executing on the device. These software processes and/or services may comprise routing process/services 244 and a "serial-to-IP translating" process 248. Note that while serial-to-IP translating process 248 is shown in centralized memory 240, alternative embodiments provide for the process to be specifically operated within the network interfaces 210 (212/214).

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Routing services 244 contain computer executable instructions executed by processor 220 to perform functions provided by one or more routing protocols, such as the Interior Gateway Protocol (IGP) (e.g., Open Shortest Path First, "OSPF," and Intermediate-System-to-Intermediate-System, "IS-IS"), the Border Gateway Protocol (BGP), etc., as will be understood by those skilled in the art. These functions may be configured to manage a forwarding information database containing, e.g., data used to make forwarding decisions. In particular, changes in the network topology may be communicated among routers 200 using routing protocols, such as the conventional OSPF and IS-IS link-state protocols (e.g., to "converge" to an identical view of the network topology). Notably, routing services 244 may also perform functions related to virtual routing protocols, such as maintaining Virtual Routing and Forwarding (VRF) instances or tunneling protocols, such as for Multi-Protocol Label Switching, etc., each as will be understood by those skilled in the art.

Currently many users, e.g., utility companies, have deployed serial communication links, e.g., IEC-101 over telephony/modem connections, in their distribution grids, such as electric utilities for the purpose of substation automation. As these communication links are upgraded to use IP as the preferred transport, many utility companies are led to deploy IEC-104 to transport the direct serial link over the IP network, particularly for devices that only support the serial communication (e.g., legacy devices).

As shown in FIG. 1, assume that the terminal unit 1 is a remote terminal unit (RTU) that acts as a slave to a master terminal unit (MTU) located on terminal unit 2. It should be noted that the following is brought only as an example and the same explanation equally applies to a balanced mode wherein the RTUs communicate in a peer-to-peer relationship. (Notably, as used herein, a "local terminal unit" implies any type of terminal unit that is attached locally to the router, while "remote terminal unit" implies any type of terminal unit that is located in a remote site beyond the IP network. As such, "RTU" should be used to imply only a specific name of a terminal unit according to the specific utility example given herein.) According to the translation illustratively used to interconnect the serial data links over the IP network, Router 1 (an RTU router) 120 may act as master to the RTU over data link 1 ("DL1"), and as a slave to Router 2 (router 125) in a server/client relationship. That MTU router may then act as the slave to the master MTU 115 over data link 2 (DL2).

In this setup, the translation process 248 of Router 1 (120) translates the serial (e.g., IEC-101) messages from the RTU 110 (a slave device) and transmits them as IP packets (e.g., IEC-104 messages) to Router 2 (125). Router 2 (125) may then translate those IP packets back to serial messages (e.g., IEC-101), and transmits those messages over DL2 to the MTU 115 (e.g., a SCADA control). This double translation allows the MTU 115 to receive the native serial traffic.

As noted above, one problem associated with serial over TCP/IP communication, however, is that current implementations simply take the serial data and put it on TCP sockets. That is, there is no ability to carry certain key serial communication attributes across the TCP/IP network as the serial communication originally intended.

Enhancements for Serial-over-TCP/IP Transport

The techniques herein map attributes and events of serial communication to those available in the underlying TCP/IP network when serial data is carried over a Raw TCP transport. Specifically, according to one or more embodiments of the disclosure as described in detail below, a router establishes a serial-over-TCP/IP communication session between terminal units using raw-TCP encapsulation. For the session, the router maps "important" serial characters to TCP out-of-band (OOB) communication fields, maps serial flow control signals to TCP/IP receiver-window advertisements, and dynamically adjusts a TCP/IP priority based on serial payload priority. Accordingly, the router may thus communicate data over the serial-over-TCP/IP session based on the mappings and priority.

Illustratively, the techniques described herein may be performed by hardware, software, and/or firmware, such as in accordance with the serial-to-IP translating process 248, which may contain computer executable instructions executed by the processor 220 (or independent processor of interfaces 210) to perform functions relating to the techniques described herein, e.g., in conjunction with routing process 244. For example, the techniques herein may be treated as extensions to conventional protocols, such as the various serial-to-TCP/IP protocols, and as such, may be processed by similar components understood in the art that execute those protocols, accordingly.

Figure 3:
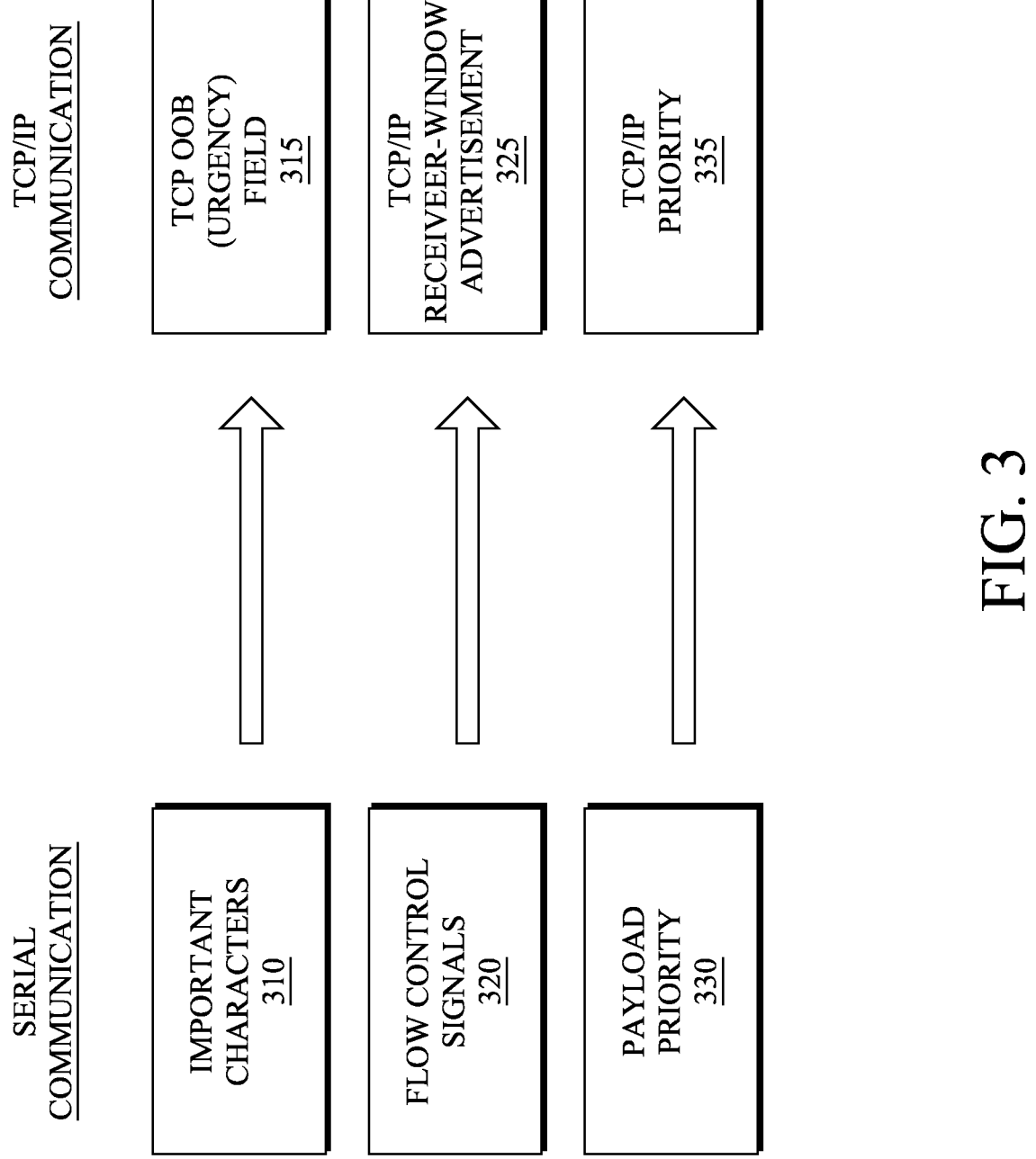
FIG. 3 illustrates an example view of translating serial communication to TCP/IP communication in accordance with one or more embodiments described herein.

Operationally, a router (e.g., router 1) establishes a serial-over-TCP/IP communication session between terminal units (e.g., MTU and RTU via router 2) using raw-TCP encapsulation. Enhanced translation between serial data and TCP/IP data may then commence according to the techniques herein, with reference generally to FIG. 3, such that the router communicates data over the serial-over-TCP/IP session based on the mappings and priority as described below.

First, the techniques herein leverage the TCP out-of-band (OOB) communication fields in a manner that maps "important" serial characters to those fields. For instance, TCP uses an Urgent ("URG") Flag and an Urgent pointer to indicate presence of urgent data (see, for example, the Internet Engineering Task Force's (IETF's) Request for Comments (RFC) 793). Serial protocols have some important serial characters (e.g., a serial BREAK signal) that need to be transported as soon as possible to the communicating peer. According to the techniques herein, the encapsulating router may map such important characters 310 onto the TCP OOB data 315 so that it is transported and processed in a timely fashion at the remote end. This will ensure that the urgent data can be processed even before all the pending bytes in the TCP stream are processed, if the receiver so chooses. (In other words, the important serial characters may comprise instructions that are to be processed prior to any pending data already received by a receiver.)

Second, the techniques herein leverage the TCP receiver-window advertisements. In particular, TCP uses receiver-window advertisement to communicate to the sender about how much data it can send. In a normal TCP communication, this is used for TCP flow control and congestion avoidance. Serial communications have their own requirements for flow control, such as either hardware based (RTS/CTS—Request To Send/Clear To Send signals), or Software based (XON/XOFF messages). According to the techniques herein, these serial flow control signals 320 may be mapped onto the TCP/IP receiver-window advertisements 325. There are several advantages of this. First, this ensures that the application (in this case serial communication channel) is able to influence the underlying transport layer. Second, because TCP can buffer data, there is no way for a receiver to tell the sender to stop sending data at the transport level. Instead, advertising this information in the TCP header allows the receiver to essentially stop transmission from the sender—just like an XOFF would do for a regular serial communication channel.

Third, the techniques herein examine the serial data to control TCP/IP priority values of the IP packets (e.g., the type-of-service (ToS) field or a Differentiated Services Code Point (DSCP) field). Conventionally, serial-over-TCP/IP requires the priority value (e.g., DSCP field) to be hard-configured as part of the configuration and uses that value for entire communication session. According to the techniques herein, however, the payload of the serial communication is examined and used to mark the ToS/DSCP bits of the IP packets (that is, a TCP/IP priority can be dynamically adjusted based on serial payload "priority"). For example, the known Distributed Network Protocol (version 3) (DNP3) has a concept of "Unsolicited Responses", which is typically sent by the outstation devices when an urgent event occurs at them that cannot wait for the periodic polling by the master. The techniques herein thus look for such "higher priority" messages, and upon detection of such messages, set the socket option to dynamically change the traffic priority (DSCP/ToS bits) in the IP header. (For example, said differently, a high serial payload priority for which a high TCP/IP priority is set may correspond to an unsolicited response as the serial payload.)

In this manner, based on these enhanced translation features (mapping attributes and events of serial communication to those available in the underlying TCP/IP network), the techniques herein provide for more robust serial-over-TCP/IP communication sessions.

Figure 4:
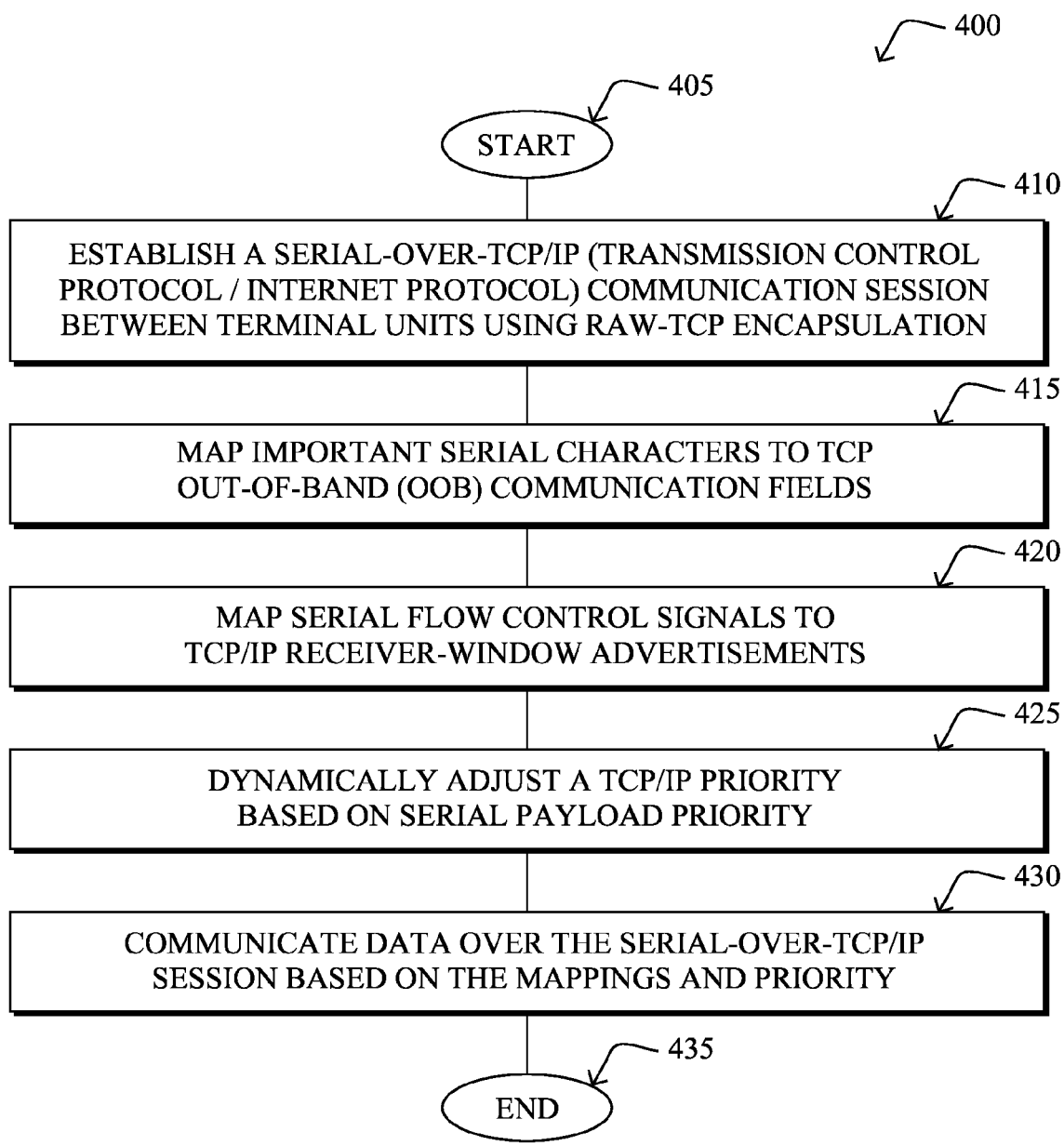
FIG. 4 illustrates an example simplified procedure for providing enhancements for transporting serially over TCP/IP using raw TCP encapsulation in a communication network in accordance with one or more embodiments described herein.

FIG. 4 illustrates an example simplified procedure 400 for providing enhancements for transporting serially over TCP/IP using raw TCP encapsulation in a communication network in accordance with one or more embodiments described herein. The procedure 400 may start at step 405, and continues to step 410, where, as described in greater detail above, a router establishes a serial-over-TCP/IP (Transmission Control Protocol/Internet Protocol) communication session between terminal units using raw-TCP encapsulation (e.g., with a local terminal unit and a remote router connected to a remote terminal unit). According to the techniques herein, in step 415, the router maps "important" serial characters 310 to TCP out-of-band (OOB) communication fields 315, and in step 420, maps serial flow control signals 320 to TCP/IP receiver-window advertisements 325. Furthermore, in step 425, the router may also dynamically adjust a TCP/IP priority 335 based on serial payload priority 330, as noted above. Accordingly, in step 430, the router may communicate data over the serial-over-TCP/IP session based on the mappings and priority, and the procedure ends in step 435. Notably, the process 400 continues with the ability to continue translating between serial and TCP/IP communications as data is received.

It should be noted that while certain steps within procedure 400 may be optional as described above, the steps shown in FIG. 4 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, provide for enhancements for transporting serially over TCP/IP using raw TCP encapsulation in a communication network. In particular, by tying the serial communication attributes with those of the TCP/IP network, the techniques herein improve the responsiveness (delay/latency, handling of flow-control and traffic prioritization) of serial communication over a Raw TCP transport.

While there have been shown and described illustrative embodiments that provide for enhancements for transporting serially over TCP/IP using raw TCP encapsulation in a communication network, it is to be understood that various other adaptations and modifications may be made within the spirit and scope of the embodiments herein. For example, the embodiments have been shown and described herein where the IP session conforms to an IEC-104 protocol and the serial data links conform to an IEC-101 protocol. However, the embodiments in their broader sense are not so limited, and may, in fact, be used with other suitable protocols, such as proprietary protocols operating over the IP network. Also, while the above embodiments are directed to two routers at either end of an IP network, it may also be possible to have a single translation scenario, such as one router translating from a serial data link for an RTU (e.g., IEC-101 connection) to an MTU that is attached to the IP network (e.g., an MTU capable of IEC-104 communication). In this instance, the sole router may be configured to synchronize the serial data link with the IP session by itself, rather than communicating the synchronization information to another router to synchronize two serial data links. Further, as noted above, the techniques herein have generally been described with reference to master and slave communications. However, the embodiments herein equally apply to both master/slave configurations as well as to a balanced (peer-to-peer) relationship between the two entities on the serial link.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
    establishing a serial-over-TCP/IP (Transmission Control Protocol/Internet Protocol) communication session between terminal units using raw-TCP encapsulation;
    mapping serial characters to TCP out-of-band (OOB) communication fields;
    mapping serial flow control signals to TCP/IP receiver-window advertisements;
    dynamically adjusting a TCP/IP priority based on serial payload priority; and
    communicating data over the serial-over-TCP/IP session based on the mapped serial characters, the mapped serial flow control signals and the adjusted TCP/IP priority.

2. The method as in claim 1, wherein the serial characters comprise instructions that are to be processed prior to any pending data already received by a receiver.

3. The method as in claim 1, wherein the serial characters comprise a serial break signal.

4. The method as in claim 1, wherein the TCP OOB communication fields comprise an urgent flag and urgent pointer.

5. The method as in claim 1, wherein the serial flow control signals comprise request to send/clear to send (RTS/CTS) signals.

6. The method as in claim 1, wherein the serial flow control signals comprise XON and XOFF signals.

7. The method as in claim 1, wherein a high serial payload priority for which a high TCP/IP priority is set corresponds to an unsolicited response as the serial payload.

8. The method as in claim 1, wherein the TCP/IP priority is set within one of either a type-of-service (ToS) field or a Differentiated Services Code Point (DSCP) field.

9. An apparatus, comprising:
    a serial data link network interface configured to communicate over a serial data link with a local terminal unit;
    an Internet Protocol (IP) network interface configured to communicate over an IP session with a remote router;
    a processor coupled to the network interfaces and adapted to execute one or more processes; and
    a memory configured to store a process executable by the processor, the process when executed operable to:
        establish a serial-over-TCP/IP (Transmission Control Protocol/Internet Protocol) communication session between terminal units using raw-TCP encapsulation;
        map serial characters to TCP out-of-band (OOB) communication fields;
        map serial flow control signals to TCP/IP receiver-window advertisements;
        dynamically adjust a TCP/IP priority based on serial payload priority; and
        communicate data over the serial-over-TCP/IP session based on the mapped serial characters, the mapped serial flow control signals and the adjusted TCP/IP priority.

10. The apparatus as in claim 9, wherein the serial characters comprise instructions that are to be processed prior to any pending data already received by a receiver.

11. The apparatus as in claim 9, wherein the serial characters comprise a serial break signal.

12. The apparatus as in claim 9, wherein the TCP OOB communication fields comprise an urgent flag and urgent pointer.

13. The apparatus as in claim 9, wherein the serial flow control signals comprise request to send/clear to send (RTS/CTS) signals.

14. The apparatus as in claim 9, wherein the serial flow control signals comprise XON and XOFF signals.

15. The apparatus as in claim 9, wherein a high serial payload priority for which a high TCP/IP priority is set corresponds to an unsolicited response as the serial payload.

16. The apparatus as in claim 9, wherein the TCP/IP priority is set within one of either a type-of-service (ToS) field or a Differentiated Services Code Point (DSCP) field.

17. A tangible, non-transitory, computer-readable media having software encoded thereon, the software when executed by a processor operable to:
    establish a serial-over-TCP/IP (Transmission Control Protocol/Internet Protocol) communication session between terminal units using raw-TCP encapsulation;
    map serial characters to TCP out-of-band (OOB) communication fields;
    map serial flow control signals to TCP/IP receiver-window advertisements;
    dynamically adjust a TCP/IP priority based on serial payload priority; and
    communicate data over the serial-over-TCP/IP session based on the mapped serial characters, the mapped serial flow control signals and the adjusted TCP/IP priority.

18. The computer-readable media as in claim 17, wherein the serial characters comprise a serial break signal.

19. The computer-readable media as in claim 17, wherein the TCP OOB communication fields comprise an urgent flag and urgent pointer.

20. The computer-readable media as in claim 17, wherein the serial flow control signals are selected from a group consisting of: request to send/clear to send (RTS/CTS) signals; and XON and XOFF signals.

* * * * *